(No Model.) 2 Sheets—Sheet 1.
E. S. BARREIRAS.
MAGUEY MILL.
No. 308,049. Patented Nov. 18, 1884.
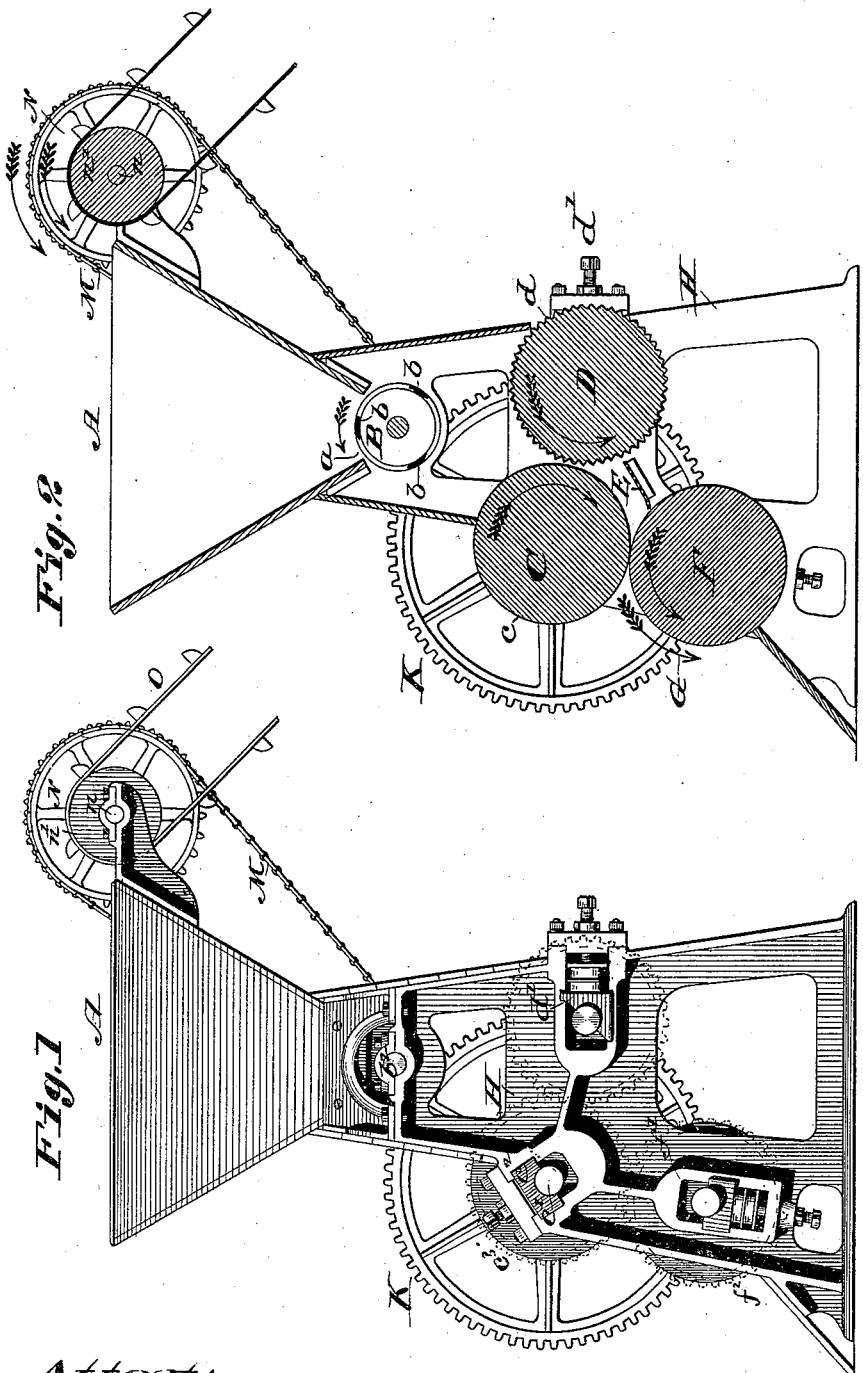
Attest:
Charles Pickles
C. E. Hunt
Inventor:
Enrique S. Barreiras
by C. D. Moody atty (No Model.)  2 Sheets—Sheet 2.
E. S. BARREIRAS.
MAGUEY MILL.
No. 308,049. Patented Nov. 18, 1884.
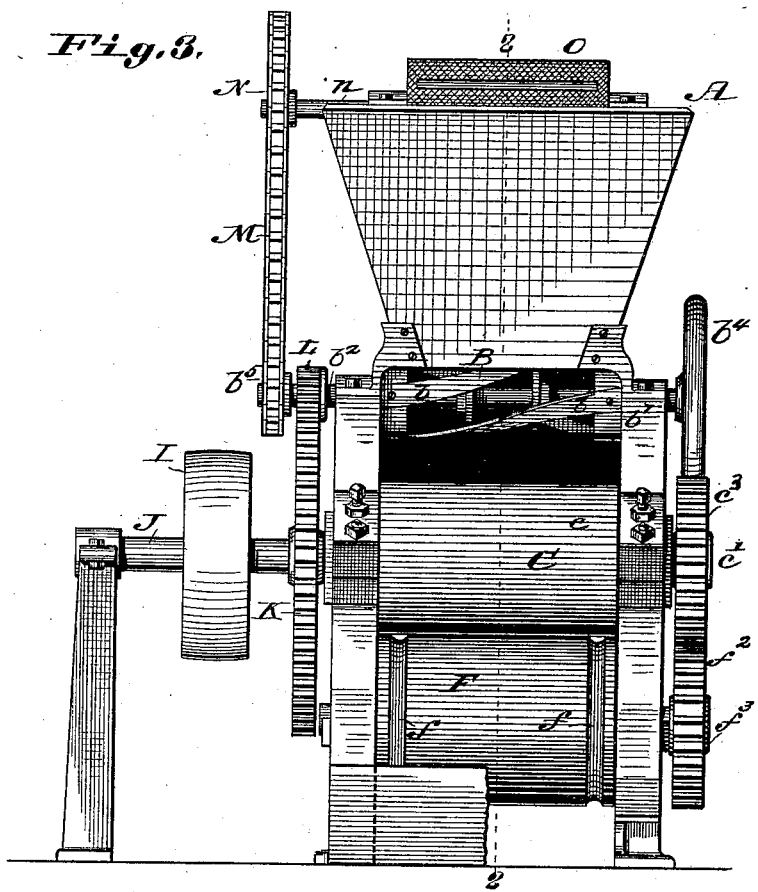
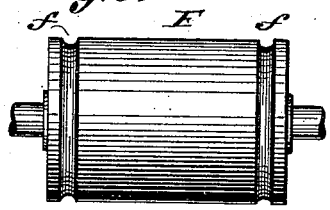
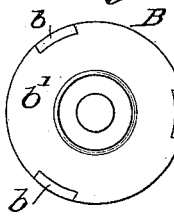
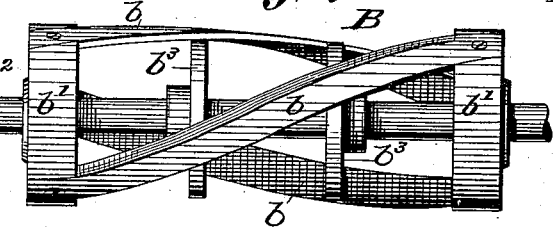
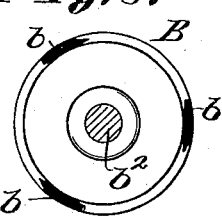

UNITED STATES PATENT OFFICE.

ENRIQUE S. BARREIRAS, OF ST. LOUIS, MISSOURI.

MAGUEY-MILL.

SPECIFICATION forming part of Letters Patent No. 308,049, dated November 18, 1884.

Application filed February 28, 1884. (No model.)

*To all whom it may concern:*

Be it known that I, ENRIQUE S. BARREIRAS, of St. Louis, Missouri, have made a new and useful Improvement in Maguey-Mills, of which the following is a full, clear, and exact description, reference being had to the annexed drawings, making part of this specification, in which—

Figure 1 is a side elevation of the mill; Fig. 2, a vertical section on the line 2 2 of Fig. 3; Fig. 3, an elevation at right angles to that of Fig. 1; Fig. 4, an elevation of one of the crushing-rolls; Fig. 5, an elevation of the lower discharging-roll; Fig. 6, an end elevation of the knife-bearing drum; Fig. 7, a side elevation of the knife-bearing drum; and Fig. 8, a cross-section of the knife-bearing drum.

The same letters of reference denote the same parts.

The present mill is designed especially for expressing the juice from the maguey-plant which grows in Mexico. That part of the plant from which the liquor is obtained is placed in the hopper A of the mill. The pieces at the bottom of the hopper encounter a knife, B, which extends across the opening $a$ in the bottom of the hopper. This knife, as shown more distinctly in Figs. 6, 7, 8, consists of a series of spirally-extended blades, $b\ b\ b$, attached to the heads $b'\ b'$, which in turn are fastened to the shaft $b^2$. The blades may also, between the heads, be supported by the disks $b^3\ b^3$. The knife rotates and operates to slice the plants. The slices fall downward through or past the knife and between a pair of rolls, C D. These rolls are constructed and relatively arranged as follows: The roll C has a smooth surface, $c$. The roll D has a fluted or serrated surface, $d$. It is also at a lower level than the roll C. The surfaces of the rolls C D nearly touch. The slices fall as stated, so as to come under the action of the rolls C D. The serrations upon the roll D operate to draw the slices downward between the surfaces $c\ d$, and as they pass between the rolls, the juice is expressed from the slices. It is important to prevent the slices from slipping out of place on the other side of the rolls, and for that reason the roll C, as stated, is placed at a higher elevation than that of the roll D. Underneath the space between the rolls C D is an inclined grating, E. The liquid extracted passes through the grating and is caught in a suitable vessel beneath. (Not shown in the drawings.) The solid portion from which the liquid has been separated passes from the grating between the rolls C F, and is thereby discharged from the machine, as indicated by the arrow G, Fig. 2. The roll C therefore serves partly as a crushing-roll and partly as a discharging-roll, and its surface $c$ for that purpose, partly, is made smooth, as stated. As a portion of the juice is liable to pass onto the roll F, that roll is grooved toward its ends, substantially as shown at $f\ f$, Fig. 5, and such of the juice as collects upon the roll F is caught in these grooves. The bearings of the roll C are fixed in the frame H of the machine. The bearings $d'\ d'$ of the roll D, as well as the bearings $f'\ f'$ of the roll F, are made of rubber or other springy or elastic material, so as to yield to enable the rolls to accommodate themselves to the varying thickness of the material passing them.

Power is applied to the mill by means of the pulley I upon the shaft J. A gear, $k$, upon the shaft J engages with a pinion, L, upon the knife-shaft $b^2$. Upon the other end of the shaft $b^2$ is a fly-wheel, $b^4$. The shaft $c'$ of the roll C is provided with a gear, $c^3$, which engages with a gear, $f^2$, upon the shaft $f^3$ of the roll F. The shaft $b^2$ is also supplied with a sprocket-wheel, $b^5$, from which a chain, M, leads to a sprocket-wheel, N, upon the shaft $n$. This last-named shaft is furnished with a pulley, $n'$, over which an elevator-belt, O, is carried, and by means of which the plants are delivered into the hopper.

I am aware that rotary knives have been used in cane-mills, and also in other machines for slicing prior to expressing liquids, and that crushing-rolls have been combined with such knives. These devices I neither broadly claim singly nor in combination.

I claim—

A maguey-mill comprising the following instrumentalities: a hopper for receiving the plant, a horizontal rotary knife-bearing drum, B, at the throat of the hopper, a main shaft, J, means for transmitting motion from the main shaft to the drum, a feed-apron or endless carrier also driven from said main shaft, a smooth-faced crushing-roll, C, a spring-actuated smooth-faced delivery-roll, F, the spring-actuated serrated roll D, and the inclined grating E, all arranged and adapted to operate substantially in the manner and for the purposes set forth.

E. S. BARREIRAS.

Witnesses:
C. D. MOODY,
THOMAS MAHER.